United States Patent [19]
Lawrence

[11] Patent Number: 6,055,459
[45] Date of Patent: Apr. 25, 2000

[54] METHOD FOR PREVENTING WINDUP IN PID CONTROLLERS EMPLOYING NONLINEAR GAIN

[75] Inventor: Richard C. Lawrence, Lansdale, Pa.

[73] Assignee: Honeywell Inc., Minneapolis, Minn.

[21] Appl. No.: 08/918,563

[22] Filed: Aug. 22, 1997

[51] Int. Cl.$^7$ ..................................... G05B 13/02

[52] U.S. Cl. .................. 700/42; 700/45; 700/37

[58] Field of Search ..................... 364/162, 165, 364/157; 318/610; 700/42, 45, 37

[56] References Cited

U.S. PATENT DOCUMENTS

| | | | |
|---|---|---|---|
| 4,268,784 | 5/1981 | Ganaway | 318/610 |
| 4,556,956 | 12/1985 | Dickenson et al. | |
| 5,384,526 | 1/1995 | Bennett | |
| 5,504,672 | 4/1996 | Hardiman et al. | 364/165 |

FOREIGN PATENT DOCUMENTS

| | | |
|---|---|---|
| 0 786 708A1 | 7/1997 | European Pat. Off. |
| 03 042 702A1 | 2/1991 | Japan . |

*Primary Examiner*—Emmanuel L. Moise
*Assistant Examiner*—Esaw Abraham
*Attorney, Agent, or Firm*—Anthony Miologos

[57] ABSTRACT

A method of preventing windup in a PID controller when using a nonlinear gain parameter is disclosed that is used in the PID controller of a process control system. The PID controller is arranged to produce within a current execution cycle a Control Variable (CV) to a device that is controlling a process responsive to an input Process Variable (PV), a setpoint (SP), and a gain parameter (K). The present invention receives the PV, the SP, and the K and generates a proportional, integral, and derivative component of the deviation of the PV from the SP. The components so generated are used to calculate an incremental output CV for the current execution cycle. A current value of gain is next calculated by subtracting the value of the gain for the current cycle from the value of the gain from the previous cycle. Testing for a linear or nonlinear gain parameter is done next and, responsive to a nonlinear gain parameter, a nonlinear gain change component is calculated and added to the incremental output CV. An output CV is generated for the current execution cycle by adding the incremental output CV modified by the nonlinear gain change component to the CV value of the previous execution cycle. The accumulated sum of proportional, integral, and derivative components of previous execution cycles are updated with the proportional, integral, and derivative components generated by the current execution cycle. These accumulated values will be used in calculating the nonlinear gain change component in the next cycle. However, if the testing identifies a linear gain parameter, the nonlinear gain change calculation is skipped and the output CV is generated by adding the incremental output CV to the CV value of the previous execution cycle.

6 Claims, 3 Drawing Sheets

METHOD FOR PREVENTING WINDUP IN PID CONTROLLERS EMPLOYING NONLINEAR GAIN

FIELD OF THE INVENTION

This invention relates generally to control methods and more particularly to a method of preventing windup of a Proportional-Integral-Derivative (PID) controller when using nonlinear gain parameters.

BACKGROUND OF INVENTION

The so-called Proportional-Integral-Derivative (PID) Controller has been known for quite some time and has been found to provide considerable advantages in many control applications. PID controllers generate a control signal composed of a first component that is proportional to (P), a second component that is the time integral of (I), and a third component that is the time derivative of (D), the deviation of a process variable signal from a setpoint. The control signals generated by the PID controller are normally "floating" due to the dynamics of the integral and derivative terms. Internally, the controller output is calculated as increments of output change, but the increments are accumulated to provide a full-value output.

PID controllers can be configured to operate in either an interactive (Real) form or alternatively a noninteractive (Ideal) form. The Real form emulates traditional pneumatic-PID controllers, where the proportional, integral, and derivative components are calculated as the sum of the proportional and integral components and multiplied by the derivative component. The derivative component interacts in the time domain with the proportional and integral components. In the Ideal form the proportional, integral, and derivative components are all summed in the time domain. The derivative component is added as a damped derivative to limit peak amplitude.

The controller gain parameters of both of the previously-mentioned operating forms can be adjusted to uniquely determine the controller output. The gain can be input into the PID controller as linear, gap gain, or nonlinear. Linear gain provides a fixed parameter whose value is chosen or set by the user and is applied linearly across the PID solution. Gap gain is used to reduce the sensitivity of the control action when the input process variable is in a narrow band or gap around a setpoint. The size of the band is specified by the user. Nonlinear gain provides control action proportional to the square of the error, rather than the error itself.

It can be appreciated by those skilled in this art that the PID controller's effectiveness in controlling the dynamically changing environment of a closed loop control system is directly affected by the gains applied to the controller. Properly determined gains provide a controller output that can modify the behavior of the controlled system environment by affecting the closed loop bandwidth (time needed to attenuate disturbances), damping (increasing/decreasing overshoot), and system robustness (sensitivity to disturbances).

One problem commonly found in PID controllers that use the Ideal operating form and employ either a gap or nonlinear gain is the windup of the controller. When a process variable of the controlled process oscillates in and out of the range band set for a gap gain solution, the controller output will windup and not be representative of the desired control action. Similarly, when using the nonlinear gain solution, oscillation of the process variable will cause the output of the PID controller to windup.

SUMMARY OF THE INVENTION

Therefore, there is provided by the present invention a method of preventing windup in a PID controller when using nonlinear gain parameters. The method of the present invention is used in the PID controller of a process control system used to provide operating control within a closed control loop. The PID controller is arranged to produce within a current execution cycle a Control Variable (CV) to a device that is controlling the process. The PID controller is also arranged to receive within the current execution cycle a Process Variable (PV) from the control loop indicative of the state of the controlled process, a setpoint (SP), and a gain parameter (K) from the process control system.

The present invention receives the PV from the control loop and the SP and K from the process control system and generates a proportional component of the deviation of the PV from the SP. Similarly, an integral component of the time integral of deviation of the PV from the SP and a derivative component that is a time derivative of the deviation of the PV from the SP are generated within the current execution cycle. Next, the proportional, integral, and derivative components generated are used to calculate an incremental output CV for the current execution cycle. The current value of gain is next calculated by subtracting the value of the gain for the current cycle from the value of the gain from the previous cycle. Testing for a linear or nonlinear gain parameter is done next. If a nonlinear gain parameter such as gap gain is identified, a nonlinear gain change component is calculated and added to the incremental output CV. An output CV is next generated for the current execution cycle by adding the incremental output CV modified by the nonlinear gain change component to the CV value of the previous execution cycle. The accumulated sum of proportional, integral, and derivative components of previous execution cycles are updated with the proportional, integral, and derivative components generated by the current execution cycle. These accumulated values will be used in calculating the nonlinear gain change component in the next cycle. However, if the testing identifies a linear gain parameter, the nonlinear gain change calculation is skipped and the output CV is generated by adding the incremental output CV to the CV value of the previous execution cycle.

Accordingly, it is an object of the present invention to provide a method of preventing windup in PID controllers employing nonlinear gain parameters.

It is still another object of the present invention to provide a PID controller that can discriminate and adjust its CV output based on the type of gain parameter received by the controller.

It is still another object of the present invention to provide a PID controller that can properly handle nonlinear gains thereby providing a more robust process control system.

These and other objects of the present invention will become more apparent when taken in conjunction with the following description and attached drawings and which drawings form a part of the present invention.

DETAILED DESCRIPTION OF THE INVENTION

Figure 1:
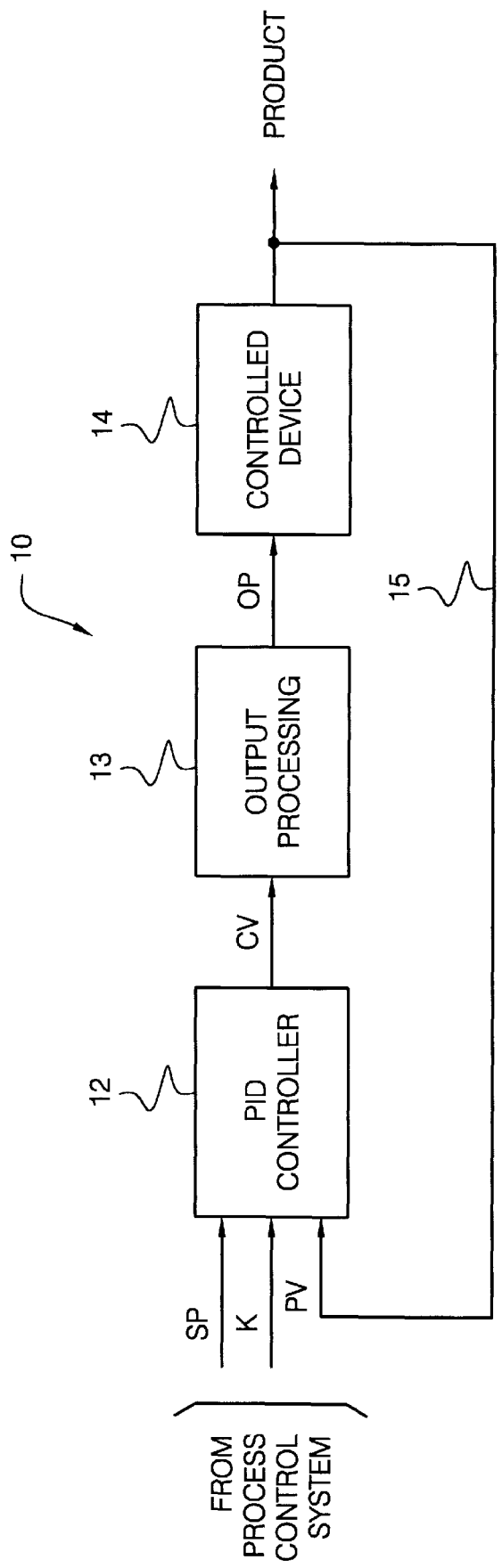
FIG. 1 is a functional diagram of a process control system control loop where the invention is used to advantage.

Turning to FIG. 1, a closed loop controlled process 10 is shown where the present invention is used to advantage. The PID controller 12 is used as a controller whose product is a control value (CV) signal that is output to an output processing module 13. The output processing module 13 translates the CV into a form required to drive the controlled device 14. For example, a digital CV signal from the PID controller can be converted to an analog signal of either a varying voltage or current that may be required to operate the controlled device 14. The output value (OP) of processing module 13 is applied to controlled device 14, such as a valve or other mechanical actuator that directly affects the controlled process. The effects of the controlled device are input back to the PID controller via line 15 as a process variable (PV). The PID controller 12 also receives a setpoint (SP) signal. The SP signal is set by the user or by an automated process control system (not shown). The SP input to PID controller 12 is used to set an initial value and an operating reference point for the PID controller's operation. Ideally, the PID controller operates to reduce error in the control loop to zero. Additionally, the SP signal is used to represent error as the difference between the PV and the SP.

The PID controller 12 can be implemented in one of many forms known to those skilled in the art. For example, the controller can be characterized by analog or digital circuitry using discrete components where the controller resides as a standalone device that controls a process. Alternatively, the PID controller can be implemented entirely in software where its functions are represented as algorithms. The PID algorithms receive the PV and SP and calculate and output the CV. The PID software algorithm can be one of a set of control algorithms residing in a central database of an automated process control system and used to generate the CV solution by the central processing unit of the automated process control system. The selection and use of the PID controller function can be under control of either an operator or a user-written software program.

In process control systems where the PID controller 12 is implemented in software, the Ideal form of the PID controller function can be expressed by the following algorithm:

$$CV(t)=K[E(t)+1/T1\int E(t)dt+T2dE(t)/dt]$$

where

K=Gain;
T1=Reset time;
T2=Rate;
E=Error (i.e. PV−SP).

The output of the Ideal PID algorithm CV is the sum of its proportional, integral, and derivative components. Internally, the PID controller output is calculated as increments of output change and, therefore, the algorithm in its incremental form is expressed as:

$$CV(t)=Id/dt\{K[E(t)+1/T1\int E(t)dt+T2dE(t)/dt]$$

which in digital form becomes $$CV(t)=CV(tl)+Del\_CV$$

where Del_CV is the incremental output during each execution cycle of the controller which is added to the past output value.

If gain of the controller is linear, that is, K does not change with each execution cycle, then the following algorithm works accurately to compute the PID controller's CV output.

$$Del\_CV=K*d/dt[E(t)+1/T1\int E(t)dt+T2E(t)/dt]$$

When using a linear gain option, the value of K is set by the user or operator to provide for a required PID controller output for a statically determinate process.

However, when a gap gain option is chosen to reduce the sensitivity of the control action, such as when the PV is in a narrow band around the SP, the above-identified linear gain PID algorithm is modified by deriving the value for K:

$$K=KLIN*KGAP$$

where KLIN is a linear gain parameter and KGAP is a gain modification factor specified by the user. The gap gain option shown above is used if the sum of SP minus the bottom limit of the gap (GAPLO) is less than or equal to the PV and less than or equal to the sum of the SP and the upper limit of the gap (GAPHI).

$$\text{If } (SP-GAPLO) \leq PV \leq (SP+GAPHI)$$

Similarly, when a nonlinear gain option is chosen, the above-identified linear gain PID algorithm is modified by deriving the value for K using the following:

$$K=KLIN*KNL$$

where KLIN is a linear gain parameter and KNL is a nonlinear gain modification factor derived by the following algorithm:

$$KNL=NLFM+(NLGAIN*(IPV-SPI)/100)$$

where NLFM is a nonlinear gain form value and NLGAIN is a nonlinear gain value specified by the user.

Figure 2:
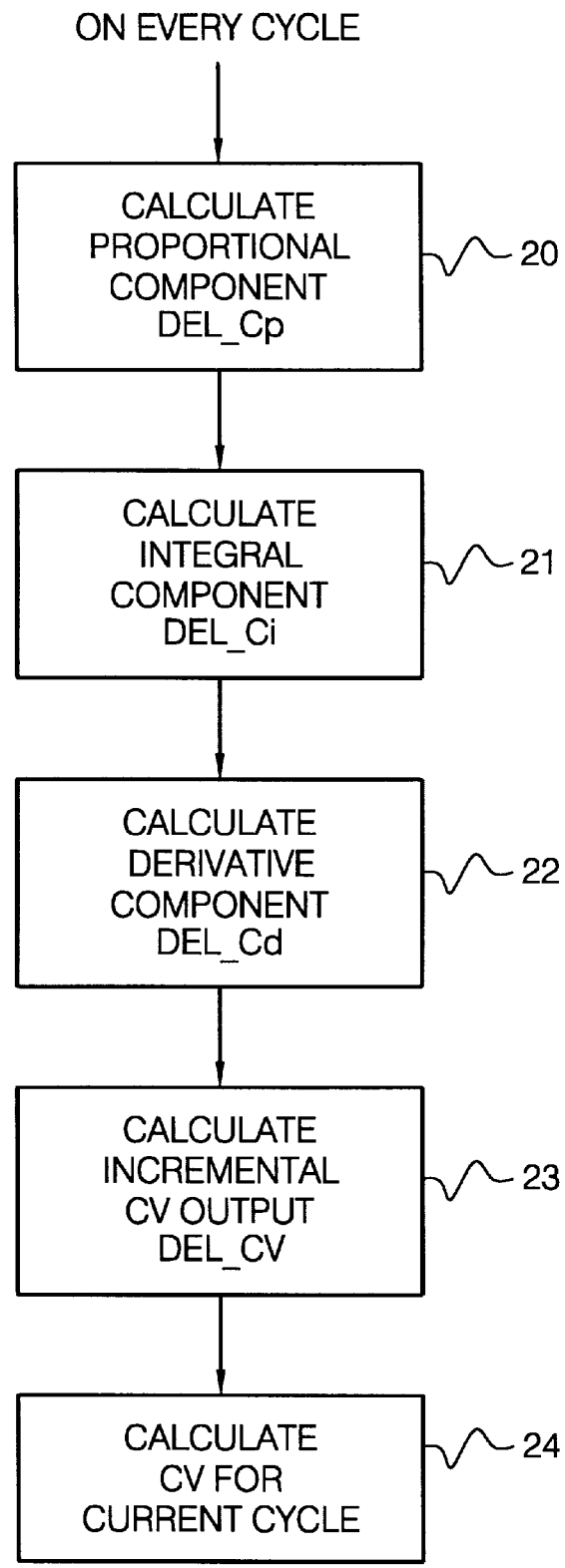
FIG. 2 is a block diagram illustrating a PID controller method that calculates an incremental controlled variable using linear gain parameters.

Turning to FIG. 2, a block diagram of the method of calculating the CV by a PID controller 12 for linear gain is illustrated. As can be seen and appreciated by those skilled in the art, the algorithm explained above is used to calculate the three distinct components required to calculate the CV incremental output. For each increment of output change or cycle, a proportional component Del_Cp (block 20), an integral component Del_Ci (block 21), and a derivative component Del_Cd (block 22) are calculated. Using the proportional, integral, and derivative components so calculated, an incremental output Del_CV (block 23) is calculated. This can be expressed as:

$$Del\_CV=K*(Del\_Cp+Del\_Ci+Del\_Cd)$$

The CV is calculated for the execution cycle (block 24) and is expressed as:

$$CV=Cv_{n-1}+Del\_CV$$

As previously mentioned, this incremental form of Ideal PID algorithm works accurately when the gain is linear for each execution cycle. However, when a nonlinear gain parameter, such as gap gain, is used in the PID controller in order to reduce the sensitivity of the controller, the above-described algorithms exhibit windup when the value of the input PV oscillates. Windup is also exhibited in nonlinear gain applications where the control action is proportional to the square of the error, rather than the error itself.

Figure 3:
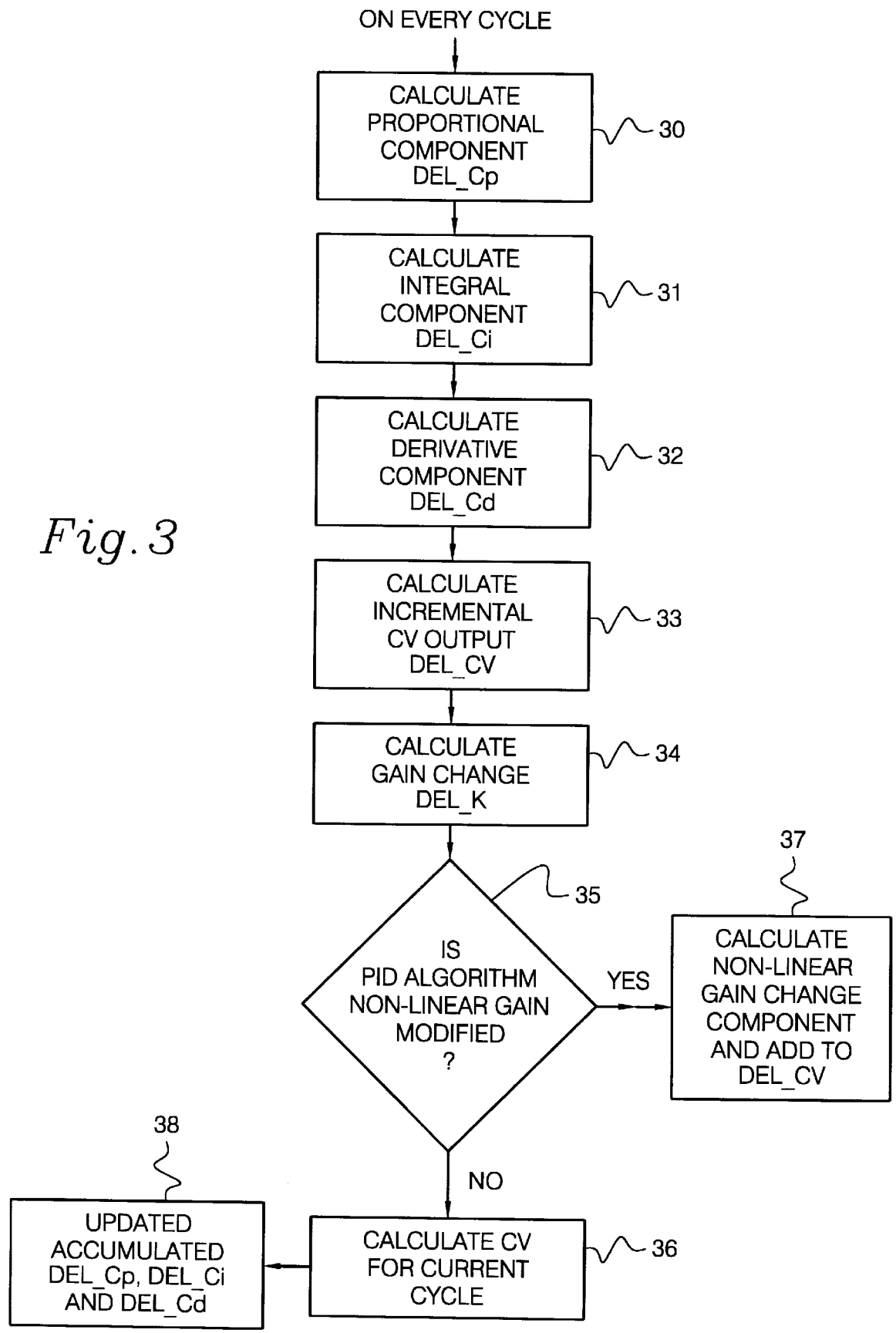
FIG. 3 is a block diagram of the improvement to the method of FIG. 2, for preventing windup of a PID controller when using nonlinear gain parameters in accordance to the present invention.

Turning now to FIG. 3 of the included drawings, the method of preventing windup of a PID controller in accordance to the present invention is illustrated. The algorithm presented and explained for the linear gain is used to calculate the three distinct components required to calculate the CV incremental output. For each increment of output change or cycle, a proportional component Del_Cp (block 30), an integral component Del_Ci (block 31), and a derivative component Del_Cd (block 32) are calculated. Using the proportional, integral, and derivative components so calculated, an incremental output Del_CV (block 33) is calculated. This is expressed as:

$$Del\_CV = K_x(Del\_Cp + Del\_Ci + Del\_Cd)$$

Next, a Del_K (block 34) calculation is made to determine the gain for the current cycle:

$$Del\_K = K_n - K_{n-1}$$

A test is made next to ascertain if the algorithm used has been modified for nonlinear gain parameters (block 35). If the algorithm has not been modified for nonlinear gain, the method advances to the calculation of CV (block 36). The CV is calculated for the present execution cycle (block 36) and is expressed as:

$$CV = Cv_{n-1} + Del\_CV$$

However, if the algorithm used has been modified for a nonlinear gain parameter, than a nonlinear gain change component is calculated and added to the Del_CV calculation (block 37).

$$Del\_CV = K*[Del\_Cp + Del\_Ci + Del\_Cd] + [CP + CI + CD]*Del\_K$$

where:
CP=sum of Del_Cp;
CI=sum of Del_Ci;
CD=sum of Del_Cd.

Once the nonlinear gain change component is added to the Del_CV calculation, the method of the present invention calculates the CV in accordance to block 36 and updates the accumulated Del_Cp, Del_Ci, and Del_Cd components. The accumulated Del_Cp, Del_Ci, and Del_Cd components are updated (Block 38) for calculation of the nonlinear gain component during the next cycle.

It should be noted that even though the present invention has been illustrated for PID controllers implemented as algorithms in a software program or routine, it will be understood by those skilled in the art that the method of the present invention can just as well be used to advantage in PID controllers that are implemented in discrete analog or digital electrical and/or mechanical devices and is not limited thereto.

The present invention has been described with particular reference to the preferred embodiments thereof. It will be obvious that various changes and modifications may be made therein without departing from the spirit and scope of the invention as defined in the appended claims.

What is claimed is:

1. A method for preventing windup of a PID controller, said PID controller used in the control loop of a process control system, said PID controller arranged to produce and output within a current execution cycle, a Control Variable (CV) to a device controlling a process and to receive within said current execution cycle a Process Variable (PV) from the control loop indicative of the state of the controlled process, a setpoint (SP), and a nonlinear gain parameter (K) from the process control system, said method comprising the steps of:

a) Receiving said PV from said control loop, said SP, and said K from said process control system during said current execution cycle and generating a proportional component of the deviation of said PV from said SP;

b) Receiving said PV from said control loop, said SP and said K from said process control system during said current execution cycle and generating an integral component that is the time integral of the deviation of said PV from said SP;

c) Receiving said PV from said control loop, said SP, and said K from said process control system during said current execution cycle and generating a derivative component that is the time derivative of the deviation of said PV from said SP;

d) Generating an incremental output CV for the current execution cycle with said proportional, integral, and derivative components;

e) Generating a nonlinear gain change component and adding said nonlinear gain change component to said incremental output CV;

f) Generating an output CV for said current execution cycle by adding the product of step e) to the output CV value of the previous execution cycle; and, g) Updating a stored sum of proportional, integral, and derivative components of the previous execution cycles with said proportional, integral, and derivative components of the current execution cycle.

2. The method of claim 1 wherein said method further includes the step of:

a) generating a gain change to determine if K has changed in the current execution cycle by subtracting the value of K in the current execution cycle from the value of K in said previous execution cycle.

3. The method of claim 2 wherein alternatively said PID controller receives a linear gain parameter and said method of preventing windup of a PID controller further includes the step of:

a) Testing for the gain parameter in the current execution cycle and, responsive to a linear gain parameter, said output CV for said current execution cycle is generated by adding said incremental output CV to the output CV value of said previous execution cycle.

4. A method for preventing windup of a PID controller, said PID controller used in the control loop of a process control system, said PID controller arranged to produce and output within a current execution cycle a Control Variable (CV) to a device controlling a process and to receive within said current execution cycle a Process Variable (PV) from the control loop indicative of the state of the controlled process, a setpoint (SP), and a nonlinear gain parameter (K) from the process control system, said method comprising the steps of:

a) Generating a proportional component of the deviation of said PV from said SP for said current control cycle;

b) Generating an integral component that is the time integral of the deviation of said PV from said SP for said current execution cycle;

c) Generating a derivative component that is the time derivative of the deviation of said PV from said SP for said current execution cycle;

d) Calculating an incremental output CV for the current execution cycle;

e) Testing for a nonlinear gain parameter K in the current execution cycle and, responsive to a nonlinear gain parameter K, generating a nonlinear gain change component and adding said nonlinear gain change component to said incremental output CV;

f) Generating an output CV for said current execution cycle by adding the product of step e) to the output CV value of the previous execution cycle; and, g) Updating a stored sum of proportional, integral, and derivative components of the previous execution cycles with said proportional, integral, and derivative components of the current execution cycle.

5. The method of claim 4 wherein said method further includes the step of:

a) generating a gain change to determine if K has changed in the current execution cycle by subtracting the value of K in the current execution cycle from the value of K in said previous execution cycle.

6. The method of claim 5 wherein alternatively said PID controller receives a linear gain parameter from said process control system and responsive to the step of testing confirming the reception of a linear gain parameter said output CV for said current execution cycle is generated by adding said incremental output CV to the sum of the proportional, integral, and derivative components of said previous execution cycle.

* * * * *